United States Patent
Jun et al.

(10) Patent No.: US 9,294,980 B2
(45) Date of Patent: Mar. 22, 2016

(54) APPARATUS AND METHOD FOR MANAGEMENT OF SERVICE REQUESTS IN AN OVERLOAD ENVIRONMENT

(71) Applicant: AT&T MOBILITY II, LLC, Atlanta, GA (US)

(72) Inventors: Jerry Jun, Austin, TX (US); Inderpreet Singh Ahluwalia, Austin, TX (US); Yunpeng Li, Austin, TX (US); Huitao Liu, Austin, TX (US)

(73) Assignee: AT&T MOBILITY II LLC, Atlanta, GA (US)

( * ) Notice: Subject to any disclaimer, the term of this patent is extended or adjusted under 35 U.S.C. 154(b) by 254 days.

(21) Appl. No.: 13/831,022

(22) Filed: Mar. 14, 2013

(65) Prior Publication Data

US 2014/0269275 A1    Sep. 18, 2014

(51) Int. Cl.
*H04W 36/22*    (2009.01)
*H04W 36/14*    (2009.01)
*H04W 48/06*    (2009.01)

(52) U.S. Cl.
CPC .............. *H04W 36/22* (2013.01); *H04W 48/06* (2013.01); *H04W 36/14* (2013.01)

(58) Field of Classification Search
None
See application file for complete search history.

(56) References Cited

U.S. PATENT DOCUMENTS

| | | | |
|---|---|---|---|
| 8,000,705 B2* | 8/2011 | Kim et al. | 455/435.1 |
| 2007/0259673 A1 | 11/2007 | Willars et al. | |
| 2010/0291941 A1 | 11/2010 | Chen | |
| 2011/0096671 A1* | 4/2011 | Lindstrom et al. | 370/242 |
| 2011/0199898 A1* | 8/2011 | Cho et al. | 370/230 |
| 2011/0201307 A1 | 8/2011 | Segura | |
| 2012/0281561 A1 | 11/2012 | Shukla et al. | |
| 2012/0281566 A1 | 11/2012 | Pelletier | |
| 2012/0287920 A1 | 11/2012 | Futaki et al. | |
| 2013/0089039 A1* | 4/2013 | Vashi et al. | 370/329 |
| 2013/0095879 A1* | 4/2013 | Gupta et al. | 455/525 |
| 2013/0107863 A1* | 5/2013 | Faccin et al. | 370/331 |
| 2013/0225169 A1* | 8/2013 | Farnsworth et al. | 455/436 |
| 2013/0279330 A1* | 10/2013 | Feng et al. | 370/230 |
| 2013/0294230 A1* | 11/2013 | Popa et al. | 370/230 |
| 2014/0016537 A1* | 1/2014 | Khobare et al. | 370/315 |
| 2014/0018071 A1* | 1/2014 | Mennerich et al. | 455/434 |

* cited by examiner

*Primary Examiner* — Faruk Hamza
*Assistant Examiner* — Cassandra Decker
(74) *Attorney, Agent, or Firm* — Guntin & Gust, PLC; Jay H. Anderson

(57) ABSTRACT

A system that incorporates the subject disclosure may include, for example, responsive to a determination that a number of failed service requests directed to a first access technology exceeds a threshold for a maximum number of failed service requests, performing cell selection associated with a second radio access technology during an overload mitigation time duration; and responsive to a determination of an expiration of the overload mitigation time duration, transmitting additional service requests associated with the first radio access technology. Other embodiments are disclosed.

20 Claims, 5 Drawing Sheets

100

300

APPARATUS AND METHOD FOR MANAGEMENT OF SERVICE REQUESTS IN AN OVERLOAD ENVIRONMENT

FIELD OF THE DISCLOSURE

The subject disclosure relates to an apparatus and method for management of service requests in an overload environment.

BACKGROUND

Communication devices can be used to provide services based on communication sessions established over a network. These communication sessions can be utilized for transmitting and receiving various data, including voice and video data.

Mobile wireless communications can involve requesting connections with cells which may or may not be accepted. These communications are according to various communication protocols. The protocols can establish procedures to be executed by the end user device, as well as by the network element(s), based on particular operating conditions.

BRIEF DESCRIPTION OF THE DRAWINGS

Reference will now be made to the accompanying drawings, which are not necessarily drawn to scale, and wherein.

DETAILED DESCRIPTION

Figure 1:
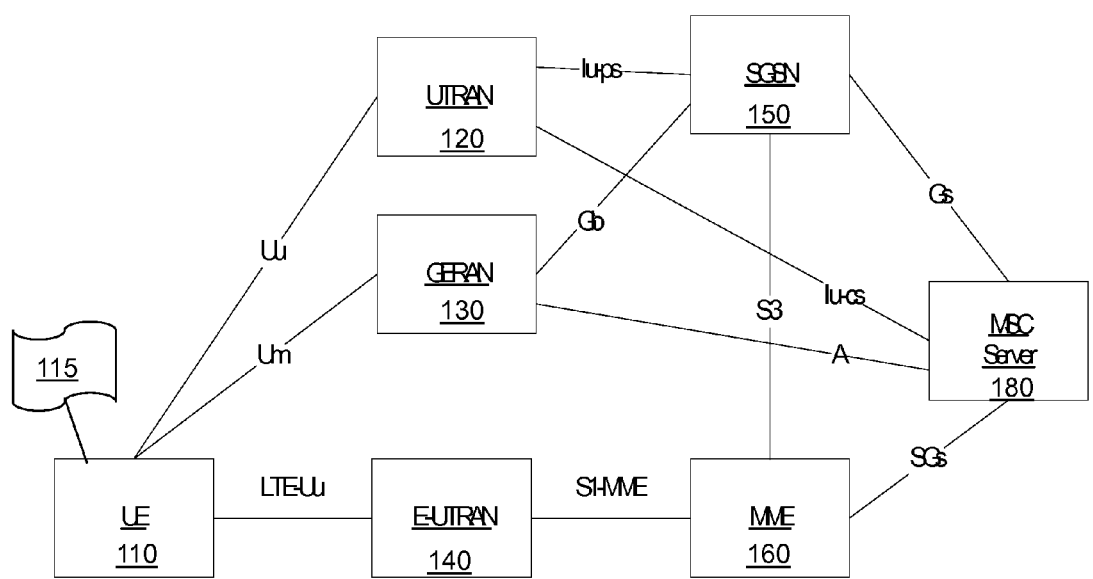
FIG. 1 depicts an illustrative embodiment of a communication system that provides communications services.

The subject disclosure describes, among other things, illustrative embodiments in which a first radio access technology network (e.g., the long term evolution (LTE) network (RAN and CORE)) is protected by way of limiting service requests in response to the LTE CORE network being overloaded. In one or more embodiments, the LTE CORE network can be protected while also allowing an end user device to search for other radio access technologies to restore voice and data service and save battery resources.

In one or more embodiments, an end user device can declare or otherwise determine that a network is inoperable or otherwise overloaded based on a count of consecutive ignored service request attempts (e.g., EMM SERVICE REQUEST attempts), and can bar or otherwise prohibit access attempts to that specific LTE network for a particular period of time (e.g., a configurable variable of time). In one or more embodiments, the end user device, during this particular period of time, can initiate a cell selection to move the end user device onto a functioning radio access technology.

As an example, the end user device can determine that the network (e.g., an LTE network) is inoperable or overloaded when N number of service requests (e.g., EMM SERVICE REQUESTS) are ignored by the network (e.g., a T3417 expiry in the LTE network). N can be a constant that can be configured by service providers such as through use of a system information broadcast and/or a subscriber identity module over-the-air (SIM OTA) communication. In one embodiment, once an end user device detects that the network is inoperable or overloaded, the end user device can forbid or otherwise prohibit access by the end user device to this network for duration of T. In one embodiment, T can be a value with an average of $T_{Avg}$ which can be configured by operators through system information broadcast and/or SIM OTA communication. In one embodiment, upon initiation of timer T countdown, the end user device can start a normal cell selection procedure (e.g., according to the $3^{rd}$ Generation Partnership Project (3GPP) specification). In one embodiment, any resultant attaches that occur from the cell selection procedure can be in both circuit-switching/packet switching (CS/PS) and packet data protocol (PDP). This can allow the outage (e.g., an LTE MME outage) from a data and voice perspective to be transparent to the user. Other embodiments are included in the subject disclosure.

One embodiment of the subject disclosure is a computer-readable storage device including computer instructions, which, responsive to being executed by a processor of a wireless communication device, cause the processor to perform operations including receiving configuration information, where the configuration information includes a threshold for a maximum number of failed service requests. The processor can monitor for service requests being transmitted from the wireless communication device associated with a first radio access technology. The processor can determine a number of failed service requests based on the monitoring. The processor can, responsive to a determination that the number of failed service requests exceeds the threshold for the maximum number of failed service requests, determine an overload mitigation time duration associated with the first radio access technology. The processor can perform cell selection associated with a second radio access technology during the overload mitigation time duration. For example, the cell selection for the second (alternative) radio access technology can be of a different cell or of the same cell associated with the overloaded radio access technology. The processor can prohibit transmitting of service requests associated with the first radio access technology during the overload mitigation time duration. The processor can, responsive to a determination of an expiration of the overload mitigation time duration, transmit service requests associated with the first radio access technology.

One embodiment of the subject disclosure is a method that includes monitoring, by a processor of a wireless communication device, for service requests being transmitted from the wireless communication device, wherein the service requests are associated with a first radio access technology. The method includes determining, by the processor, a number of failed service requests based on the monitoring. The method includes, responsive to a determination by the processor that the number of failed service requests exceeds a threshold for a maximum number of failed service requests, performing, by the processor, cell selection associated with a second radio access technology during an overload mitigation time duration associated with the first radio access technology. The method includes prohibiting, by the processor, transmitting of service requests associated with the first radio access technology during the overload mitigation time duration. The method includes responsive to a determination of an expiration of the overload mitigation time duration, transmitting, by the processor, service requests associated with the first radio access technology.

One embodiment of the subject disclosure is a wireless communication device, having a memory to store computer instructions, and having a processor coupled with the memory. The processor, responsive to executing the computer instructions, performs operations including, responsive to a determination that a number of failed service requests directed to a first access technology exceeds a threshold for a maximum number of failed service requests, performing cell selection associated with a second radio access technology during an overload mitigation time duration. The processor can, responsive to a determination of an expiration of the overload mitigation time duration, transmit service requests associated with the first radio access technology.

Referring to FIG. 1, a mobile communication system 100 is illustrated that can provide communication services, including voice, video and/or data services to mobile devices, such as end user device 110. System 100 can enable communication services over a number of different networks, such as between end user device 110 and another communication device (e.g., a second end user device) not shown. End user device 110 can be a number of different types of devices that are capable of voice, video and/or data communications, including a mobile device (e.g., a smartphone), a personal computer, a set top box, and so forth. End user device 110 can include computer instructions and/or hardware to perform service request and cell selection management functions 115. The management functions 115 can include detecting overloaded environments, such as a core network overload. As an example, a core network can become overloaded during a natural disaster, during a sporting event, or during some other situation in which the number of service requests from a large volume of devices cannot be processed (or are otherwise delayed) due to limited resources or for some other reason. The overload detection by the end user device 110 can be based on a number of criteria, including monitoring for a number of failed service requests.

The management functions 115 can also include overload mitigation steps being performed by the end user device 110, including prohibiting service requests from being transmitted that are associated with an overloaded radio access technology. The prohibition of the service requests can be for a particular period of time (e.g., an overload mitigation time duration) which may be a pre-determined time period and/or a dynamic time period. The failed service requests can be requests that have been rejected, ignored or otherwise are unsuccessful. In one embodiment, the end user device 110 can monitor the number of consecutive failed service requests that have been sent to a first cell and/or monitor the time period over which these failed consecutive service requests were sent. If the failed service requests satisfy an overload threshold then the end user device 110 can prevent service requests from being transmitted to the first cell (e.g., a first server of the first cell) of the first radio access technology, while enabling the end user device 110 to select a second radio access technology, which may or may not utilize the same cell. Service requests can then be transmitted in an effort to establish a communication session utilizing the second radio access technology. In one or more embodiments, the second radio access technology can enable communication sessions utilizing circuit switching, packet switching and packet data protocols.

In one or more embodiment, the cell selection process for the second or other radio access technology can be performed for a limited amount of time (e.g., an overload mitigation time duration). In one example, at an expiration of the overload mitigation time duration, the end user device 110 can perform actions associated with obtaining the first radio access technology, such as transmitting service requests, performing cell selection associated with the first radio access technology, and so forth. The radio access technologies in these embodiments can vary and can include the first radio access technology being an LTE service while the second radio access technology is a 3G/2G service.

In one or more embodiments, the threshold number of permissible failed service requests and/or the overload mitigation time duration can be determined based on configuration information that is received from a remote source, such as a server associated with the first cell, although other network elements and/or other communication devices, including other end user devices, can provide the configuration information to the end user device 110. The configuration information can be a maximum number of failed service requests and/or a maximum time period for transmitting service requests that are directly utilized or otherwise directly applied by the end user device 110 in determining whether to perform the radio access technology switch to mitigate a core network overload. In another embodiment, the configuration information can be indirect information that can be analyzed to determine threshold values that are to be applied. For instance, the indirect information can be historical traffic information indicating that at a particular time (e.g., time of day, day of week, etc.) an increased amount of traffic utilizes a particular radio access technology. In this example, based on the historical information, the end user device 110 can determine a threshold number of failed service requests that are permissible prior to switching to a different radio access technology, a time period for the failed service requests, and/or a time duration for the overload mitigation. Other indirect information can also be analyzed by the end user device 110 to determine the threshold value and/or the overload mitigation time duration, such as performance metrics (e.g., latency, jitter, packet loss, and so forth), expected events that will impact traffic (e.g., scheduled maintenance), and so forth.

In one embodiment, upon a detection by the network that another radio access technology is experiencing lower levels of traffic, configuration information may be transmitted to various end user devices where the configuration information has lower threshold values for the number of failed service requests that are permissible before switching to the other radio access technology.

The networks of the system 100 can include one or more of a Universal Terrestrial Radio Access Network (UTRAN) 120, a Global System for Mobile communications (GSM) Enhanced Data rates for GSM Evolution (EDGE) Radio Access Network 130 (herein referred to as GERAN 130), and an E-UTRAN 140. The system 100 can further include one or more of a Serving General packet radio service (GPRS) Support Node (SGSN) 150, a Mobility Management Entity (MME) 160 and Mobile Switching Center (MSC) 180.

In one or more embodiments, system 100 can provide for circuit switching fallback for packet switching so as to enable the provisioning of voice and other circuit switching-domain services (e.g., circuit switching UDI video/LCS/USSD) by reuse of circuit switching infrastructure, such as when the end-user device 110 is served by E-UTRAN 140. In one or more embodiments, a circuit-switching fallback enabled terminal (e.g., end user device 110) connected to E-UTRAN 140 may use GERAN 130 or UTRAN 120 to connect to the circuit switching-domain. In one or more embodiments, the circuit switching fallback and Internet protocol Multimedia Subsystem (IMS)-based services of system 100 can co-exist in a single service operator's network.

In one or more embodiments, UTRAN 120 can include node B's and radio network controllers which enable carrying many traffic types including real-time circuit-switched to IP-based packet switched traffic. The UTRAN 120 can also enable connectivity between the end user device 110 and the core network. The UTRAN 120 can utilize a number of interfaces including Iu, Uu, Iub and/or Iur. For example, the Iu interface can be an external interface that connects the radio network controllers to the core network. The Uu can be an external interface that connects a node B with the end user device 110. The Iub can be an internal interface connecting the remote network controllers with the node B. The Iur interface can be an internal interface and/or external interface for connecting multiple remote network controllers.

In one or more embodiments, GERAN 130 can facilitate communications between base stations (e.g., Ater and Abis interfaces) and base station controllers (e.g., A interfaces).

In one or more embodiments, E-UTRAN 140 can be the air interface for the LTE upgrade path for mobile networks according to the 3GPP specification. E-UTRAN 140 can include enodeBs on the network that are connected to each other such as via an X2 interface, which are connectable to the packet switch core network via an S1 interface. For example, E-UTRAN 140 can use various communication techniques including orthogonal frequency-division multiplexing (OFDM), multiple-input multiple-output (MIMO) antenna technology depending on the capabilities of the terminal, and beamforming for downlink to support more users, higher data rates and lower processing power required on each handset.

In one or more embodiments, the SGSN 150 can assume responsibility for delivery of data packets from and to mobile stations within the SGSN's geographical service or coverage area. The SGSN 150 can perform functions including packet routing and transfer, mobility management (e.g., attach/detach and location management), logical link management, and/or authentication and charging functions. In one or more embodiments, a location register of the SGSN 150 can store location information (e.g., current cell) and user profiles (e.g., addresses used in the packet data network) of users registered with the SGSN.

In one or more embodiments, MME 160 can perform the function of a control-node. For example, the MME 160 can perform functions such as idle mode tracking and paging procedure including retransmissions. The MME 160 can also choose a serving gateway for the end user device 110 such as at the initial attach and at time of intra-LTE handover involving node relocation.

In one or more embodiments, the MSC 180 can perform functions including routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

In one or more embodiments, the end user device 110 can invoke a service request procedure. The following example is described with respect to the 3GPP specification but the exemplary embodiments can be implemented for other radio access technologies and/or other communication specifications. The service request procedure can be utilized to transfer the evolved packet system mobility management (EMM) mode from EMM-IDLE to EMM-CONNECTED mode and to establish the radio and S1 bearers when uplink user data or signaling is to be sent. Another purpose of this procedure is to invoke MO/MT CS fallback or 1×CS fallback procedures. This procedure can be used when the network has downlink signaling pending; the end user device 110 has uplink signaling pending; the end user device 110 or the network has user data pending and the end user device 110 is in EMM-IDLE mode; and/or the end user device 110 in EMM-IDLE or EMM-CONNECTED mode has requested to perform mobile originating/terminating CS fallback or 1×CS fallback. The service request procedure is initiated by the end user device 110, however, for a downlink transfer of signaling, cdma2000® signaling or user data in EMM-IDLE mode, the trigger can be given by the network by means of a paging procedure.

The end user device 110 can invoke the service request procedure when: a) the end user device 110 in EMM-IDLE mode receives a paging request with CN domain indicator set to "PS" from the network; b) the end user device 110, in EMM-IDLE mode, has pending user data to be sent; c) the end user device 110, in EMM-IDLE mode, has uplink signaling pending; d) the end user device 110 in EMM-IDLE or EMM-CONNECTED mode is configured to use CS fallback and has a mobile originating CS fallback request from the upper layer; e) the end user device 110 in EMM-IDLE mode is configured to use CS fallback and receives a paging request with CN domain indicator set to "CS", or the end user device 110 in EMM-CONNECTED mode is configured to use CS fallback and receives a CS SERVICE NOTIFICATION message; f) the end user device 110 in EMM-IDLE or EMM-CONNECTED mode is configured to use 1×CS fallback and has a mobile originating 1×CS fallback request from the upper layer; g) the end user device 110 in EMM-CONNECTED mode is configured to use 1×CS fallback and accepts cdma2000® signalling messages containing a 1×CS paging request received over E-UTRAN; h) the end user device 110, in EMM-IDLE mode, has uplink cdma2000® signalling pending to be transmitted over E-UTRAN; i) the end user device 110, in EMM-IDLE or EMM-CONNECTED mode, is configured to use 1×CS fallback, accepts cdma2000® signalling messages containing a 1×CS paging request received over cdma2000® 1×RTT, and the network supports dual Rx CSFB or provide CS fallback registration parameters; j) the end user device 110, in EMM-IDLE or EMM-CONNECTED mode, has uplink cdma2000® signalling pending to be transmitted over cdma2000® 1×RTT, and the network supports dual Rx CSFB or provide CS fallback registration parameters; or k) the end user device 110 performs an inter-system change from S101 mode to S1 mode and has user data pending. In one embodiment if one of the above criteria to invoke the service request procedure is fulfilled, then the service request procedure may only be initiated by the end user device 110 when the following conditions are fulfilled: its EPS update status is EU1 UPDATED, and the TAI of the current serving cell is included in the TAI list; and no EMM specific procedure is ongoing. In one embodiment, for cases a, b, c, h and k above, if the end user device 110 is not configured for NAS signaling low priority, the end user device 110 can initiate the service request procedure by sending a SERVICE REQUEST message to the MME, starts the timer T3417, and enter the state EMM-SERVICE-REQUEST-INITIATED. In one embodiment, for cases a, b, c, h and k described above, if the end user device 110 is configured for NAS signaling low priority, and the last received ATTACH ACCEPT message or TRACKING AREA UPDATE ACCEPT message from the network indicated that the network supports use of EXTENDED SERVICE REQUEST for packet services, the end user device 110 can send an EXTENDED SERVICE REQUEST message with service type set to "packet services via S1." If the last received ATTACH ACCEPT message or TRACKING AREA UPDATE ACCEPT message from the network did not indicate that the network supports use of EXTENDED SERVICE REQUEST for packet services, the end user device 110 can instead send a SERVICE REQUEST message. After sending the SERVICE REQUEST message or EXTENDED SERVICE REQUEST message with service type set to "packet services via S1", the end user device 110 can start T3417 and enter the state EMM-SERVICE-REQUEST-INITIATED. In one embodiment, for case d described above, the end user device 110 can send an EXTENDED SERVICE REQUEST message, start T3417ext and enter the state EMM-SERVICE-REQUEST-INITIATED. In one embodiment, for case e described above: if the end user device 110 is in EMM-IDLE mode, the end user device 110 can send an EXTENDED SERVICE REQUEST message, start T3417ext and enter the state EMM-SERVICE-REQUEST-INITIATED; if the end user device 110 is in EMM-CONNECTED mode and if the end user device 110 accepts the paging, the end user device 110 can send an EXTENDED SERVICE REQUEST message with the CSFB response IE indicating "CS fallback accepted by the UE", start T3417ext and enter the state EMM-SERVICE-REQUEST-INITIATED; or if the end user device 110 is in EMM-CONNECTED mode and if the end user device 110 rejects the paging, the end user device 110 can send an EXTENDED SERVICE REQUEST message with the CSFB response IE indicating "CS fallback rejected by the end user device 110" and enter the state EMM-REGISTERED.NORMAL-SERVICE. The network shall not initiate CS fallback procedures. In one embodiment, for cases f, g, i and j described above, the end user device 110 can send an EXTENDED SERVICE REQUEST message, start T3417 and enter the state EMM-SERVICE-REQUEST-INITIATED. In some instances, if the service request is not accepted then the end user device 110 can receive a SERVICE REJECT message including an EMM cause value.

In the event of an overload (e.g., a Core Network overload) infrastructure vendors may have implemented a "silent drop" of UE SERVICE REQUESTS to mitigate any further loading of network links and processing elements. The "silent drop" of a SERVICE REQUEST often occurs when the T3417 timer expires, where the SERVICE REQUEST procedure is aborted, and where the end user device is to enter the EMM-REGISTERED state.

In response to the "silent drop" situation, one or more of the exemplary embodiments can provide for recovery of user services (e.g., voice and data) in the case of an LTE outage due to core network overload, and/or prevent applications from sending a further barrage of SERVICE REQUEST on the overloaded radio access technology, which may lead to further exacerbation of the core outage, and incapacitate the air interface as well. The exemplary embodiments can also provide a buffer of time for the LTE infrastructure to stabilize and re-establish normal operation.

In one or more embodiments, the end user device 110 can perform measurements for cell selection and reselection purposes, such as when switching to a different radio access technology because of the detected overload in the first radio access technology. As an example, the NAS can control the radio access technologies in which the cell selection should be performed, for instance by indicating radio access technologies associated with the selected PLMN, and by maintaining a list of forbidden registration area(s) and a list of equivalent PLMNs. The end user device 110 can select a suitable cell based on idle mode measurements and cell selection criteria. In order to speed up the cell selection process, stored information for several radio access technologies can be available in the end user device 110.

In one or more embodiments, the end user device 110 can utilize a number of different cell selection processes. For example, an initial cell selection procedure can be employed that requires no prior knowledge of which RF channels are E-UTRA carriers. In this example, the end user device 110 can scan all or some of the RF channels in the E-UTRA bands according to its capabilities to find a suitable cell. In one or more embodiments, on each carrier frequency, the end user device 110 need only search for the strongest cell (e.g., the strongest signal). Once a suitable cell is found this cell can be selected by the end user device 110.

In another embodiment, the end user device 110 can employ a stored information cell selection procedure. This procedure may require stored information of carrier frequencies and/or information on cell parameters, such as from previously received measurement control information elements and/or from previously detected cells. In this example, once the end user device 110 has found a suitable cell the end user device can select it. If no suitable cell is found then the initial cell selection procedure described above may be employed. In one or more embodiments, priorities between different frequencies and/or radio access technologies provided to the end user device 110 by system information or dedicated signaling may not be used in the cell selection process.

In one or more embodiments, the end user device 110 can enter an any-cell-selection state, in which the end user device can attempt to find an acceptable cell of any PLMN to camp on, trying all radio access technologies (except the prohibited first radio access technology) that are supported by the end user device and searching first for a high quality cell such as defined in the 3GPP technical specification. The end user device 110, which may not be camped on any cell, can stay in this state until an acceptable cell is found.

Figure 2:
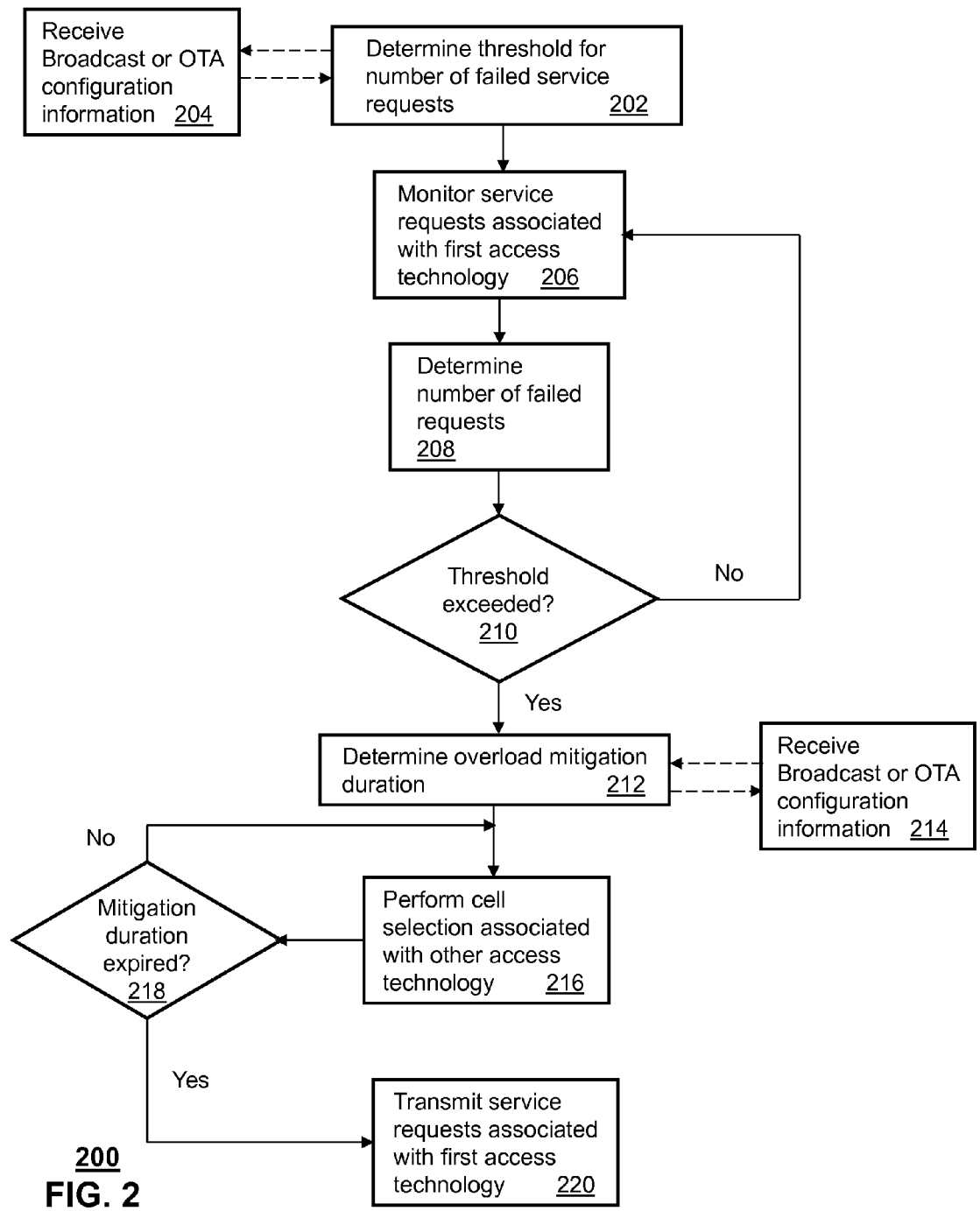
FIG. 2 depicts an illustrative embodiment of a method used in portions of the system described in FIG. 1.

FIG. 2 illustrates a method 200 for providing communication services. Method 200 is described with respect to end user device 110 but can be performed by one or more of the devices of system 100 and/or can be performed by other communication devices. Method 200 can begin at 202 in which the end user device 110 determines a threshold that is to be applied in order to determine a network overload, such as an LTE core network overload. As an example, the threshold can be a permissible number of consecutive failed service requests that have been transmitted by the end user device 110 to a first cell associated with a first radio access technology, such as LTE. In one embodiment, the threshold can be determined by receiving configuration information at the end user device 110 from the network, such as via a system information broadcast and/or a SIM OTA communication.

At 206, the end user device 110 can monitor service requests being transmitted and at 208 can determine a number of the service requests that have failed consecutively. If at 210, the number of consecutive failed service requests is still within a permissible threshold then the end user device continues to monitor the transmitted service requests. If on the other hand, the number of consecutive failed service requests exceeds the threshold then method 200 can proceed to 212 where the end user device 110 determines or otherwise identifies an overload mitigation time duration which is a time period over which the end user device is to try to switch to a different radio access technology. In one embodiment, the overload mitigation time duration can be determined by receiving configuration information at the end user device 110 from the network, such as via a system information broadcast and/or a SIM OTA communication.

At 216, the end user device 110 can initiate a cell selection procedure based on a radio access technology that is different from the first radio access technology. In one embodiment, this procedure can include selecting a cell that is different from the first cell associated with the overload detection. The cell selection procedure for other radio access technologies can be continued throughout the overload mitigation time duration as shown at 218. In one embodiment, any attachments that are made during the overload mitigation time duration can be based on both CS/PS and PDP communications. In one embodiment, the end user device 110 can prohibit or otherwise prevent transmitting service requests intended for the first radio access technology that was determined to be overloaded. At 220, upon expiration of the overload mitigation time duration, the end user device 100 can transmit service requests associated with the first radio access technology, such as LTE RAT. The expiration of the overload mitigation time duration can also trigger other actions associated with accessing the originally overloaded service, such as performing cell selection for the first radio access technology, or otherwise include the first radio access technology in the cell selection procedure. In one embodiment, after the expiration of the overload mitigation time duration, the end user device 110 can send service requests associated with the original radio access technology (e.g., LTE service) which was previously determined to be overloaded, where those service requests are being transmitted to a different cell.

In one or more embodiments, configuration information received by the end user device 110 may not be directly applicable to a selection of procedures and may require further analysis and manipulation by the end user device to determine data that can be directly applied, such as determining a maximum number of failed service requests and/or an overload mitigation time duration based on monitored network resource usage data received from a server of a cell to which the end user device is transmitting service requests. In one or more embodiments, the network status data or other information can include historical information (e.g., peak traffic times, upcoming events expected to result in traffic increases), monitored resource usage information, monitored performance parameters (e.g., latency, jitter, packet loss, and so forth), and so forth. In one or more embodiments, the configuration information can be a combination of threshold values (e.g., directly applicable without further analysis for determining control procedures) and network status data or other information (e.g., indirectly applicable via further analysis for determining control procedures).

Figure 3:
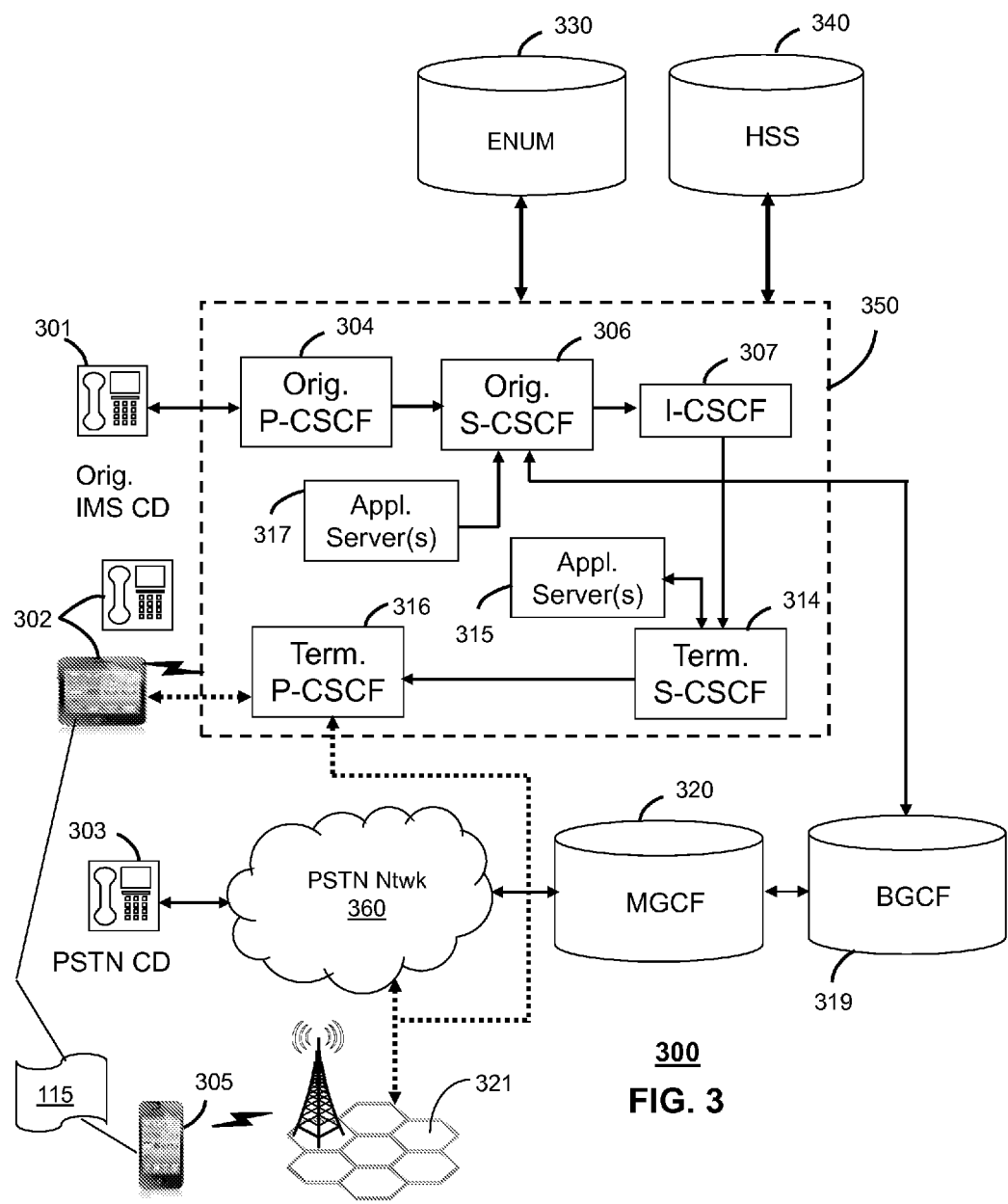
FIG. 3 depicts an illustrative embodiment of a communication system that provides communications services.

FIG. 3 depicts an illustrative embodiment of a communication system 300 employing an IP Multimedia Subsystem (IMS) network architecture to facilitate the combined services of circuit-switched and packet-switched systems. Communication system 300 can be overlaid or operably coupled with system 100 of FIG. 1 as another representative embodiment of communication system 100. System 300 enables end user devices to detect or otherwise declare overload and a mechanism to recover service utilizing a different radio access technology. For example, when a particular number of consecutive service requests are rejected or ignored (e.g., on the same cell) such as in an effort to establish LTE communications, then the end user device can initiate a cell selection procedure involving one or more different radio access technologies while also prohibiting or otherwise preventing service requests from being transmitted by the end user device via the overloaded radio access technology. The switching to the different radio access technology and/or the preventing of the transmission of service requests associated with the overloaded radio access technology can be performed for a particular time period, such as an overload mitigation time duration, which can be a pre-determined or dynamic time period provided by the service provider.

In one or more embodiments, the end user device can receive network status data from a remote source and can analyze the network status data to determine the values to be utilized for the maximum number of failed service request and/or the overload mitigation time duration. The network status data can be various types of data including historical traffic information, current network performance data, scheduled maintenance, and so forth.

Communication system 300 can comprise a Home Subscriber Server (HSS) 340, a tElephone NUmber Mapping (ENUM) server 330, and other network elements of an IMS network 350. The IMS network 350 can establish communications between IMS-compliant communication devices (CDs) 301, 302, Public Switched Telephone Network (PSTN) CDs 303, 305, and combinations thereof by way of a Media Gateway Control Function (MGCF) 320 coupled to a PSTN network 360. The MGCF 320 need not be used when a communication session involves IMS CD to IMS CD communications. A communication session involving at least one PSTN CD may utilize the MGCF 320.

IMS CDs 301, 302 can register with the IMS network 350 by contacting a Proxy Call Session Control Function (P-CSCF) which communicates with an interrogating CSCF (I-CSCF), which in turn, communicates with a Serving CSCF (S-CSCF) to register the CDs with the HSS 340. To initiate a communication session between CDs, an originating IMS CD 301 can submit a Session Initiation Protocol (SIP INVITE) message to an originating P-CSCF 304 which communicates with a corresponding originating S-CSCF 306. The originating S-CSCF 306 can submit the SIP INVITE message to one or more application servers (ASs) 317 that can provide a variety of services to IMS subscribers.

For example, the application servers 317 can be used to perform originating call feature treatment functions on the calling party number received by the originating S-CSCF 306 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 306 can submit queries to the ENUM system 330 to translate an E.164 telephone number in the SIP INVITE message to a SIP Uniform Resource Identifier (URI) if the terminating communication device is IMS-compliant. The SIP URI can be used by an Interrogating CSCF (I-CSCF) 307 to submit a query to the HSS 340 to identify a terminating S-CSCF 314 associated with a terminating IMS CD such as reference 302. Once identified, the I-CSCF 307 can submit the SIP INVITE message to the terminating S-CSCF 314. The terminating S-CSCF 314 can then identify a terminating P-CSCF 316 associated with the terminating CD 302. The P-CSCF 316 may then signal the CD 302 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 3 may be interchangeable. It is further noted that communication system 300 can be adapted to support video conferencing. In addition, communication system 300 can be adapted to provide the IMS CDs 301, 302 with the services of communication system 100 of FIG. 1.

If the terminating communication device is instead a PSTN CD such as CD 303 or CD 305 (in instances where the cellular phone only supports circuit-switched voice communications), the ENUM system 330 can respond with an unsuccessful address resolution which can cause the originating S-CSCF 306 to forward the call to the MGCF 320 via a Breakout Gateway Control Function (BGCF) 319. The MGCF 320 can then initiate the call to the terminating PSTN CD over the PSTN network 360 to enable the calling and called parties to engage in voice and/or data communications.

It is further appreciated that the CDs of FIG. 3 can operate as wireline or wireless devices. For example, the CDs of FIG. 3 can be communicatively coupled to a cellular base station 321, a femtocell, a WiFi router, a Digital Enhanced Cordless Telecommunications (DECT) base unit, or another suitable wireless access unit to establish communications with the IMS network 350 of FIG. 3. The cellular access base station 321 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 3.

Cellular phones supporting LTE can support packet-switched voice and packet-switched data communications and thus may operate as IMS-compliant mobile devices. In this embodiment, the cellular base station 321 may communicate directly with the IMS network 350 as shown by the arrow connecting the cellular base station 321 and the P-CSCF 316.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Wireless CDs 302 and 305 can be adapted with software to perform management function 115 to manage service connection requests, cell selection for alternative radio access technologies and/or prohibition of transmitting service requests to an overloaded cell/RAT for an overload mitigation time duration.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3GPP. It is further noted that some or all embodiments of the subject disclosure may in whole or in part modify, supplement, or otherwise supersede final or proposed standards published and promulgated by 3GPP.

Figure 4A:
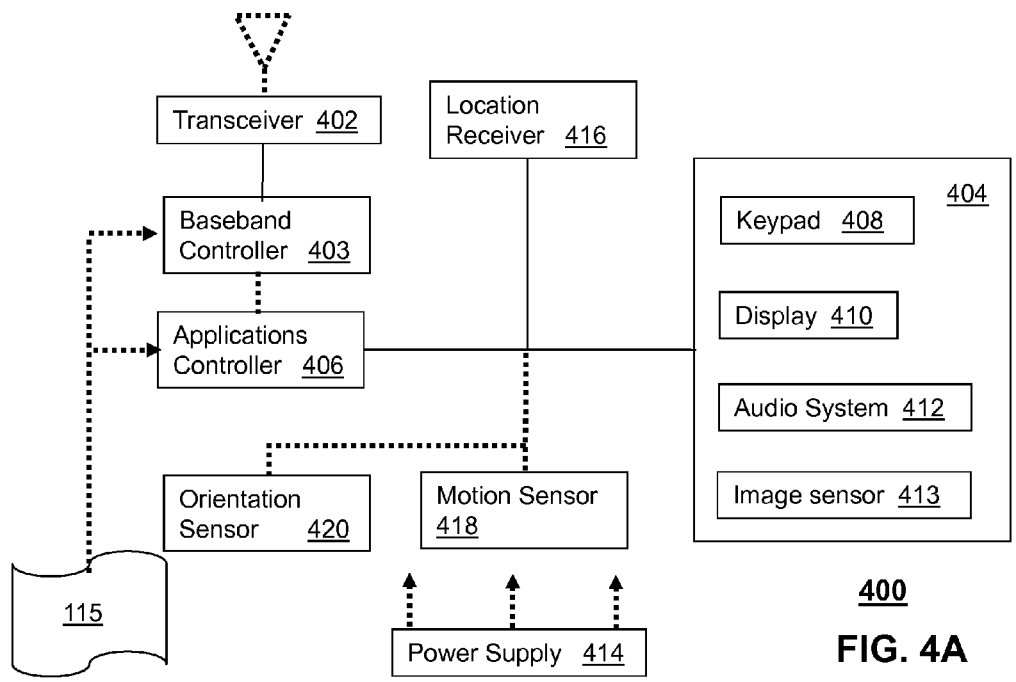
FIG. 4A depicts an illustrative embodiment of a communication device operable in the system of FIG. 1.

FIG. 4A depicts an illustrative embodiment of a communication device 400. Communication device 400 can serve in whole or in part as an illustrative embodiment of the devices depicted in FIG. 1. Device 400 can enable monitoring a number of consecutive failed service requests, such as EMM SERVICE REQUESTS in an LTE radio access technology, and can enable detection or otherwise determining network overload based on the monitoring. The device 400 can facilitate alleviating the network overload or other undesired conditions whereby a network may want to limit particular traffic and/or the device may want to utilize a different cell/RAT. The initiation of cell selection for other radio access technologies and/or the prohibition of service requests associated with an overloaded radio access technology can allow a Core Network to overcome an overloaded condition.

For example, the device 400 can receive configuration from which a threshold for a permissible number of failed service requests can be determined, and the device can count the number of consecutive service request failures (over a pre-determined time period or without respect to a time period) to determine whether an overload condition may exist. The exemplary embodiments can utilize various factors in determining an overload condition. The overload determination can be a trigger for the device 400 to perform cell selection utilizing other radio access technologies. The overload determination can also be a trigger for prohibiting or otherwise preventing transmission of service requests from the device 400 that are associated with the overloaded radio access technology.

To enable these features, communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth. In one embodiment, configuration information in the form of SIM OTA data can be obtained by the device 400, where the configuration information includes a maximum number of permissible failed service requests, an overload mitigation time duration, and/or data that enables calculation of the maximum number of permissible failed service requests and/or the overload mitigation time duration.

The communication device 400 as described herein can operate with more or less of the circuit components shown in FIG. 4A. These variant embodiments can be used in one or more embodiments of the subject disclosure.

The communication device 400 can be adapted to perform the functions of the communication devices of FIG. 1, as well as the IMS CDs 301-302 and PSTN CDs 303-305 of FIG. 3. It will be appreciated that the communication device 400 can also represent other devices that can operate in communication system 100 of FIG. 1 such as a wireless gaming console or a wireless media player.

The communication device 400 (such as via baseband controller 403 and/or applications controller 406) can be adapted in various embodiments to perform the functions 115 described with respect to FIG. 1, including determining a triggering event for the cell selection associated with alternative radio access technologies and/or preventing transmission of service requests associated with an overloaded cell/RAT.

In one or more embodiments, management functions 115 (e.g., determining a network overload, cell selection associated with alternative radio access technologies and/or preventing transmission of service requests associated with an overloaded cell/RAT) can be performed by the baseband controller 403 and/or the applications controller 406 of device 400. In one embodiment, the baseband controller 403 can manage all of the long-distance radio functions, which may not include WiFi and/or Bluetooth communications. For example, the baseband processor 403 can utilize its own RAM and/or firmware. The baseband processor 403 due to the radio control functions (signal modulation, encoding, radio frequency shifting, etc.) can be highly timing dependent, and can utilize a real time operating system. In one embodiment, the baseband processor 403 can operate using an operating system that is distinct from an operating system of the applications processor 406.

Device 400 can include various other components that may or may not be illustrated in FIG. 4A, including power amplifiers, antennas, memory, user interfaces, SIM card, clock oscillator, battery and so forth. The components of device 400 can be arranged in various configurations, including positioning the baseband processor 403 between the applications processor 406 and the transceiver 402 to facilitate the control exerted by the baseband processor to prevent (temporarily or otherwise) service requests associated with an overloaded cell/RAT from being transmitted while allowing other service requests associated with alternative radio access technologies to be transmitted.

Figure 4B:
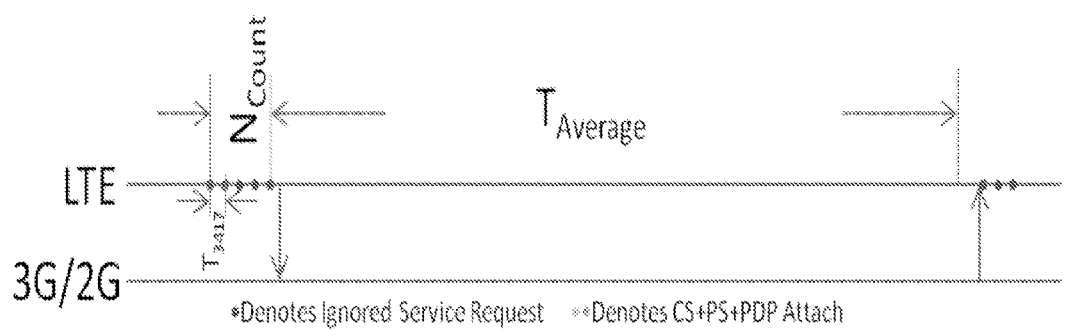
FIG. 4B depicts an illustrative embodiment of a timing diagram associated with service requests being generated by the communication device of FIG. 4A.

FIG. 4B illustrates a timing diagram in which ignored service requests are being monitored to determine an overload condition. In this embodiment, each of the service requests are associated with LTE communications where subsequent service requests are transmitted after expiration of timer T3146. For this example, the threshold number of permissible failed consecutive service requests is five, so upon reaching the threshold, the end user device 400 initiates cell selection in an alternative radio access technology (e.g., 3G/2G service). After expiration of the overload mitigation time duration (denoted $T_{average}$) the end user device can again return to transmitting service requests for the LTE service.

Upon reviewing the aforementioned embodiments, it would be evident to an artisan with ordinary skill in the art that said embodiments can be modified, reduced, or enhanced without departing from the scope of the claims described below. For example, configuration information can be shared peer-to-peer rather than or in combination with a centralized distribution of the configuration information. For example, a first end user device can receive configuration information (e.g., a maximum number of failed service requests, an overload mitigation time duration and/or network status data from which these values can be determined) from a second end user device that is operating in or within proximity to a first cell to which the configuration information applies.

In another embodiment, the alternative radio access technologies that can be utilized in the cell selection responsive to a determination of core network overload can be selected from a group of RATs based on their current network status and their ability to provide a desired service.

In one embodiment, when N consecutive service requests are ignored on an LTE RAT (e.g., T3417 timer expiry), the end user device can bar or disable the LTE RAT of the camped PLMN for T minutes. This can also trigger starting a cell selection procedure to search for other RATs of the same PLMN. For example, the default value for N can be 5 while the default value for T can be the value of the T3402 timer. Other values can also be utilized, including dynamic values that are adjustable based on a number of factors, including network conditions, device capability, quality of service requirements, and so forth. In one embodiment, the end user device can follow the 3GPP specification to decide the value of T3402. In another embodiment, the end user device can read N and/or T values from a file on SIM card and/or the value of N and/or T can be controlled by SIM OTA communications. In one embodiment, a power cycle of the end user device can clear the barring/disabling of the LTE RAT. In another embodiment, the barring/disabling can be cleared when the end user device is directed by the network (e.g., handover or redirect) to the LTE RAT of the same PLMN. In another embodiment, the barring/disabling can be cleared after a pre-determined or dynamic (e.g., calculated based on network conditions) time duration.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
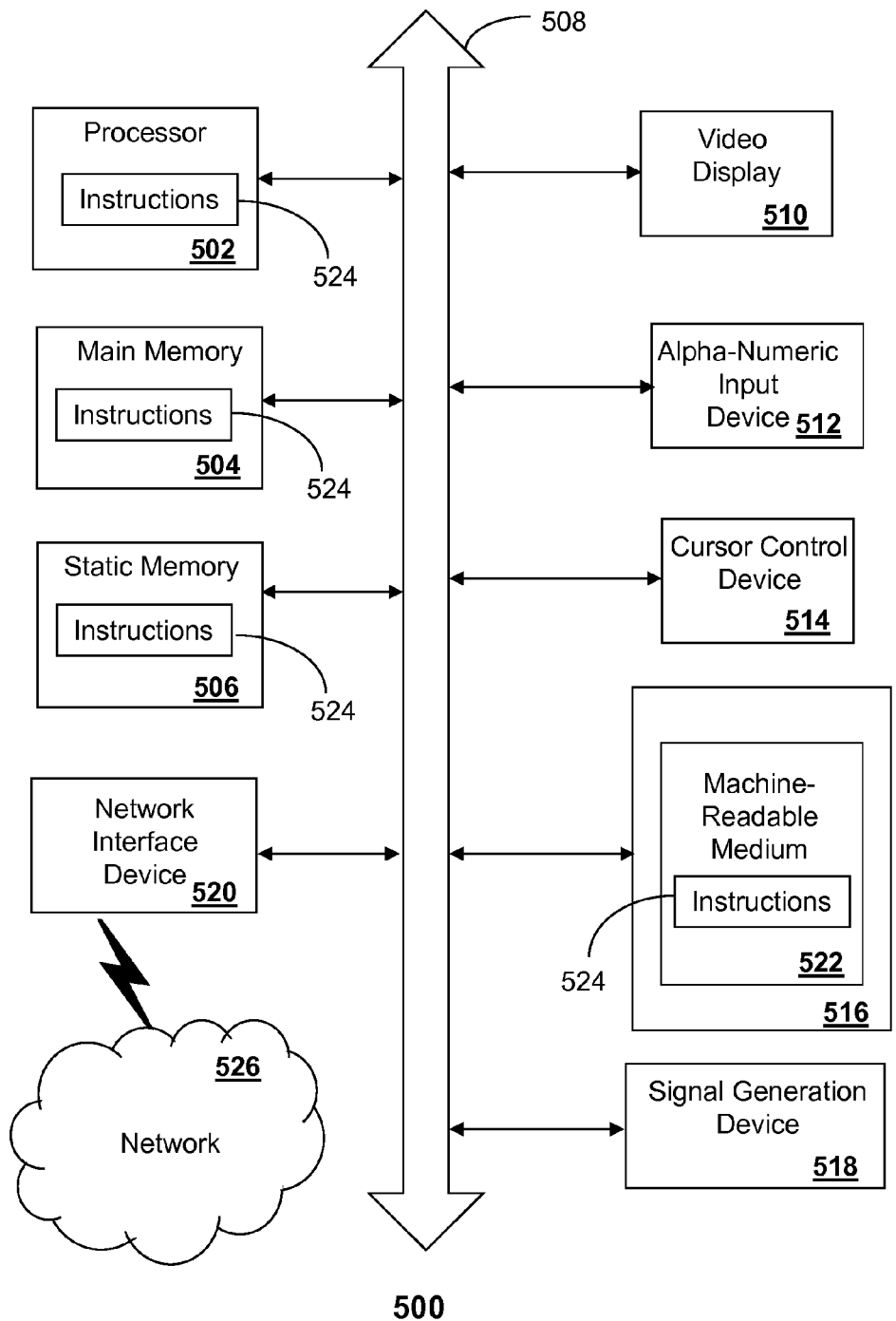
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. For example, system 500 can enable determining a network overload based on monitoring of failed service requests and can initiate overload mitigation procedures, including cell selection for alternative radio access technologies and/or preventing service requests from being transmitted that are associated with an overloaded cell/RAT. One or more instances of the machine can operate, for example, as the end user device 110, the communication device 400 and other devices of FIGS. 1-4. In some embodiments, the machine may be connected (e.g., using a network 526) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display. The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable storage device comprising executable instructions, which, responsive to being executed by a processor of a wireless communication device, cause the processor to perform operations comprising:

receiving configuration information via a system information broadcast or via a subscriber identity module over-the-air communication, wherein the configuration information includes status data of a network;

calculating a threshold for a maximum number of failed service requests, based on the configuration information;

monitoring for service requests being transmitted from the wireless communication device to a first cell associated with a first radio access technology;

determining a number of consecutive failed service requests based on the monitoring, wherein failure of a service request corresponds to expiration of a predetermined time period without a response to the service request;

responsive to a determination that the number of consecutive failed service requests exceeds the threshold for the maximum number of failed service requests, determining an overload mitigation time duration associated with the first radio access technology from a calculation based on the status data;

performing a first cell selection to select a second cell associated with a second radio access technology during the overload mitigation time duration, the second cell being different from the first cell;

performing an attachment during the overload mitigation time duration and responsive to the selection of the second cell, wherein the attachment is based on circuit switching, packet switching and packet data protocol communications;

prohibiting transmitting of service requests associated with the first radio access technology during the overload mitigation time duration; and responsive to a determination of an expiration of the overload mitigation time duration:
    performing a second cell selection to select a third cell associated with the first radio access technology, and
    allowing transmission of additional service requests associated with the first radio access technology.

2. The machine-readable storage device of claim 1, wherein the configuration information comprising the status data based on which the threshold for the maximum number of failed service requests is calculated and the status data based on which the overload mitigation time duration is calculated comprise historical traffic information and performance metrics relating to the network.

3. The machine-readable storage device of claim 2, wherein the status data further comprises events expected to affect network traffic.

4. The machine-readable storage device of claim 1, wherein the configuration information is received from a remote source.

5. The machine-readable storage device of claim 1, wherein the configuration information is received from a server associated with the first cell.

6. The machine-readable storage device of claim 1, wherein the third cell is different from the first cell.

7. The machine-readable storage device of claim 1, wherein the first cell selection is performed using stored information regarding carrier frequencies and cell parameters for a plurality of cells.

8. The machine-readable storage device of claim 1, wherein the service requests comprise evolved packet system mobility management service requests, and wherein the first radio access technology corresponds to a long term evolution radio access technology.

9. A method comprising:
    receiving, by a processor of a wireless communication device, configuration information via a system information broadcast or via a subscriber identity module over-the-air communication, wherein the configuration information includes network status data;
    calculating, by the processor, a threshold for a maximum number of failed service requests, based on the configuration information;
    monitoring, by the processor, for service requests being transmitted from the wireless communication device to a first cell, wherein the service requests are associated with a first radio access technology;
    determining, by the processor, a number of consecutive failed service requests based on the monitoring, wherein failure of a service request corresponds to expiration of a predetermined time period without a response to the service request; and
    responsive to a determination by the processor that the number of consecutive failed service requests exceeds the threshold for the maximum number of failed service requests:
        performing, by the processor, a first cell selection to select a second cell associated with a second radio access technology during an overload mitigation time duration associated with the first radio access technology, wherein the overload mitigation time duration is determined from a calculation based on the network status data;
        performing, by the processor, an attachment during the overload mitigation time duration and responsive to the selection of the second cell, wherein the attachment is based on circuit switching, packet switching and packet data protocol communications; and
        prohibiting, by the processor, transmitting of service requests associated with the first radio access technology during the overload mitigation time duration; and
    responsive to a determination by the processor of an expiration of the overload mitigation time duration:
        performing, by the processor, a second cell selection to select a third cell associated with the first radio access technology, and
        allowing, by the processor, transmission of additional service requests associated with the first radio access technology.

10. The method of claim 9, wherein the network status data comprises historical traffic information and performance metrics relating to a network.

11. The method of claim 9, wherein the service requests comprise evolved packet system mobility management service requests, and wherein the first radio access technology corresponds to a long term evolution radio access technology.

12. The method of claim 9, wherein the configuration information is received from a remote source.

13. The method of claim 9, wherein the configuration information is received from a server associated with the first cell.

14. The method of claim 9,
    wherein the first cell selection is performed using stored information regarding carrier frequencies and cell parameters for a plurality of cells.

15. A wireless communication device, comprising:
    a memory that stores computer instructions; and
    a processor coupled with the memory, wherein the processor, responsive to executing the computer instructions, performs operations comprising:
        receiving configuration information via a system information broadcast or via a subscriber identity module over-the-air communication, wherein the configuration information includes network status data;
        calculating a threshold for a maximum number of failed service requests, based on the configuration information;
        monitoring for service requests being transmitted from the wireless communication device to a first cell associated with a first radio access technology;
        responsive to a determination that a number of consecutive failed service requests exceeds the threshold for the maximum number of failed service requests, wherein failure of a service request corresponds to expiration of a predetermined time period without a response to the service request,
        determining an overload mitigation time duration associated with the first radio access technology from a calculation based on the network status data;
        performing first cell selection of a second cell associated with a second radio access technology, the second cell being different from the first cell, during the overload mitigation time duration;
        performing an attachment during the overload mitigation time duration and responsive to the selection of the second cell, wherein the attachment is based on circuit switching, packet switching and packet data protocol communications;
        prohibiting transmitting of service requests associated with the first radio access technology during the overload mitigation time duration; and
        responsive to a determination of an expiration of the overload mitigation time duration,
        performing a second cell selection to select a third cell associated with the first radio access technology, and transmitting additional service requests associated with the first radio access technology.

16. The wireless communication device of claim 15, wherein the first cell selection is performed using stored information regarding carrier frequencies and cell parameters for a plurality of cells.

17. The wireless communication device of claim 15, wherein
the network status data comprises historical traffic information and performance metrics relating to a network.

18. The wireless communication device of claim 17, wherein the configuration information is received from a remote source.

19. The wireless communication device of claim 17, wherein the configuration information is received from a server associated with the first cell.

20. The wireless communication device of claim 17, wherein the service requests comprise evolved packet system mobility management service requests, and wherein the first radio access technology corresponds to a long term evolution radio access technology.

* * * * *